United States Patent [19]
Hosoi et al.

[11] Patent Number: 5,255,154
[45] Date of Patent: Oct. 19, 1993

[54] PORTABLE ELECTRONIC APPARATUS WITH A LATCH MECHANISM INCLUDING AN INTERLOCK

[75] Inventors: Takashi Hosoi; Keizo Ohgami; Fumiaki Takeda, all of Tokyo, Japan

[73] Assignee: Kabushiki Kaisha Toshiba, Kawasaki, Japan

[21] Appl. No.: 695,501

[22] Filed: May 6, 1991

[30] Foreign Application Priority Data

May 7, 1990 [JP] Japan ................. 2-115810

[51] Int. Cl.$^5$ .................. H05K 5/02; A45C 13/10
[52] U.S. Cl. .................. 361/680; 70/58; 70/72; 70/74; 70/312; 361/681; 361/740
[58] Field of Search ................ 70/58, 69, 71, 72, 74, 70/75, 312; 364/708; 361/380, 390, 391, 392, 393, 394, 395, 399

[56] References Cited

U.S. PATENT DOCUMENTS

| | | |
|---|---|---|
| 2,557,670 | 6/1951 | Luft .................. 70/72 |
| 3,392,556 | 7/1968 | Atkinson .................. 70/71 |
| 3,545,238 | 12/1970 | Gehrie et al. .................. 70/74 X |
| 4,363,226 | 12/1982 | Remington et al. .................. 70/312 X |
| 4,366,685 | 1/1983 | Remington .................. 70/312 |
| 4,395,892 | 8/1983 | Remington .................. 70/69 X |
| 4,416,126 | 11/1983 | Remington .................. 70/71 |
| 4,479,198 | 10/1984 | Romano et al. . |
| 4,547,006 | 10/1985 | Castanier .................. 70/71 X |
| 4,574,601 | 3/1986 | Werk et al. .................. 70/312 X |
| 4,671,688 | 6/1987 | Brashears . |
| 4,744,005 | 5/1988 | Milani . |
| 4,751,872 | 6/1988 | Lawson, Jr. . |
| 4,769,764 | 9/1988 | Levanon . |
| 4,842,531 | 6/1989 | Takemura . |
| 4,858,162 | 8/1989 | Kieffer et al. .................. 364/708 |
| 4,864,523 | 9/1989 | Sasaki .................. 364/708 |
| 4,894,792 | 1/1990 | Mitchell et al. .................. 364/708 |
| 4,941,841 | 7/1990 | Darden et al. .................. 364/708 X |

FOREIGN PATENT DOCUMENTS

| | | |
|---|---|---|
| 0066664 | 5/1981 | European Pat. Off. . |
| 0189796 | 8/1986 | European Pat. Off. . |
| 8625029 | 1/1987 | Fed. Rep. of Germany . |
| 2-65384 | 5/1990 | Japan . |
| 2031055 | 4/1980 | United Kingdom .................. 70/71 |
| 2202381 | 9/1988 | United Kingdom . |

OTHER PUBLICATIONS

"Reference Manual" Toshiba T5200 Portable Personal Computer, No. PAD 8849-1, preface, pp. IV–VIII and 3/24–3/29, Sep., 1988.
"Reference Manual" Toshiba T3100e Portable Personal Computer, No. PAD 8685-3, preface, pp. IV–VIII and 5/18–5/29, Sep., 1988.
Electronics, vol. 16, No. 16, Oct., 1988, Hasbrouck Heighers, N.J., pp. 107–109, "PC-Board Suppliers Look For Material and Design Gains".
IBM Technical Disclosure Bulletin, vol. 32, No. 1, Jun., 1989, New York, pp. 74–75, "Self-Aligning Connector".

Primary Examiner—Leo P. Picard
Assistant Examiner—Michael W. Phillips
Attorney, Agent, or Firm—Cushman, Darby & Cushman

[57] ABSTRACT

A portable computer includes a housing and a keyboard unit mounted on the housing. A display unit is mounted on the housing to be movable between a closed position wherein the keyboard unit is covered by the display unit and a desired opened position wherein the keyboard is exposed. A latch mechanism for locking the display unit in the closed position is provided at the display unit. The mechanism includes a pair of latch hooks rockable between a latch position wherein each hook engages a latch hole of the housing and a release position wherein each hook is disengaged form the housing, and an interlocking member, movable together with the latch hooks. A sliding member is slidably attached to each latch hook so as to be movable between a restricted position, wherein the sliding member is situated in the latch hole to restrict disengagement of the hook, and a retracted position, wherein the sliding member is retracted from the latch hole. When an operator begins to move the latch hooks toward the release position, the interlocking member slides the sliding members to the retracted position, allowing the latch hooks to continue on toward the release position. When a combination lock attached to the display unit is engaged, movement of the interlocking member is restricted by the lock and the hooks are locked in the latch position.

8 Claims, 13 Drawing Sheets

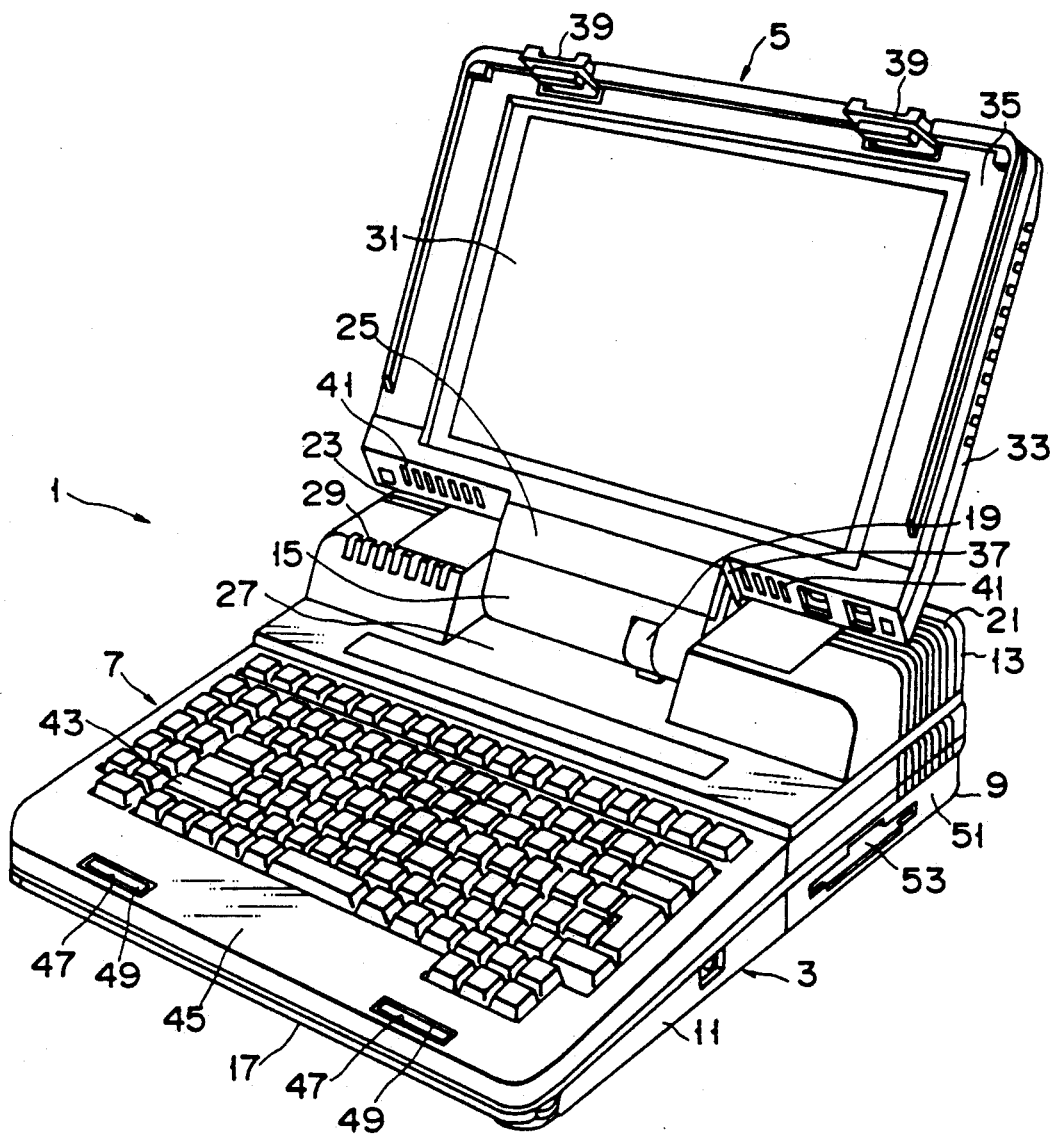
F I G. 1

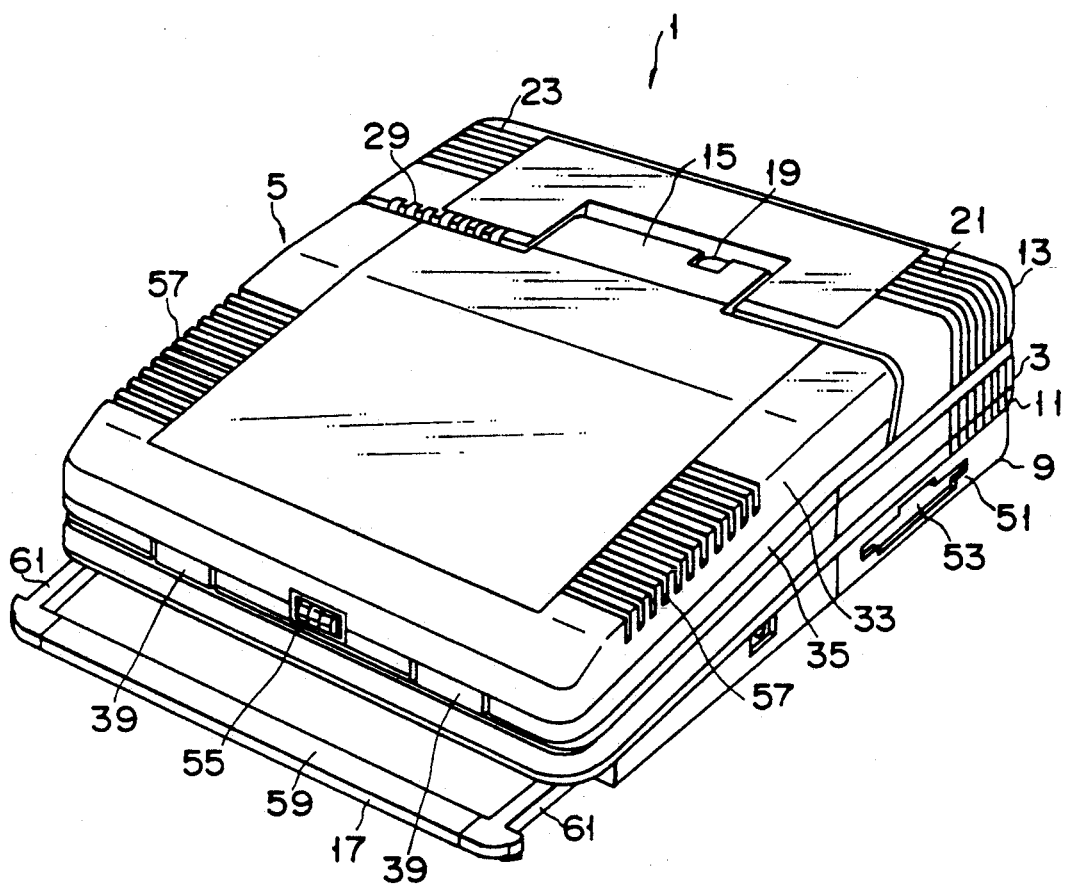
F I G. 2

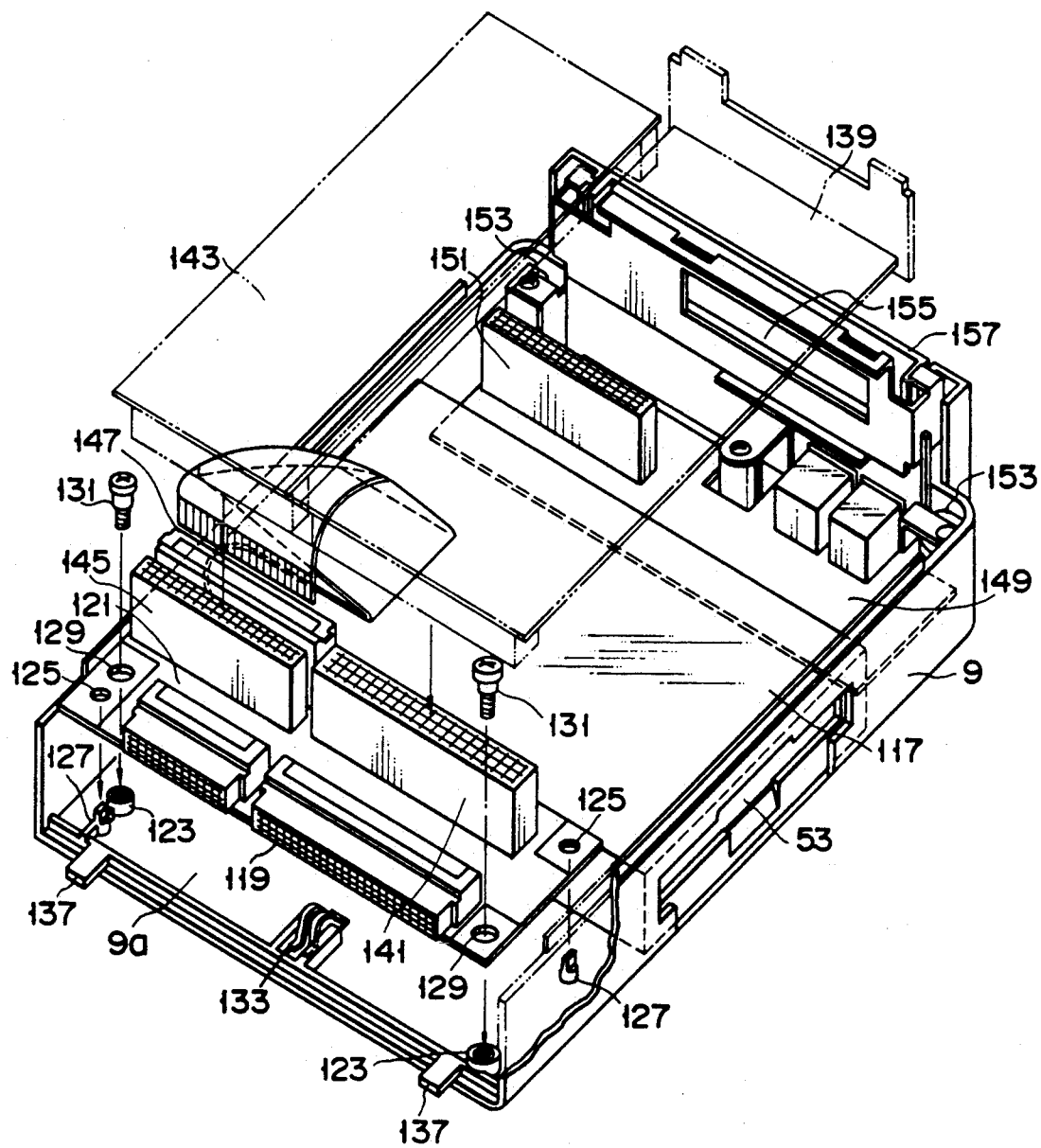
F I G. 9

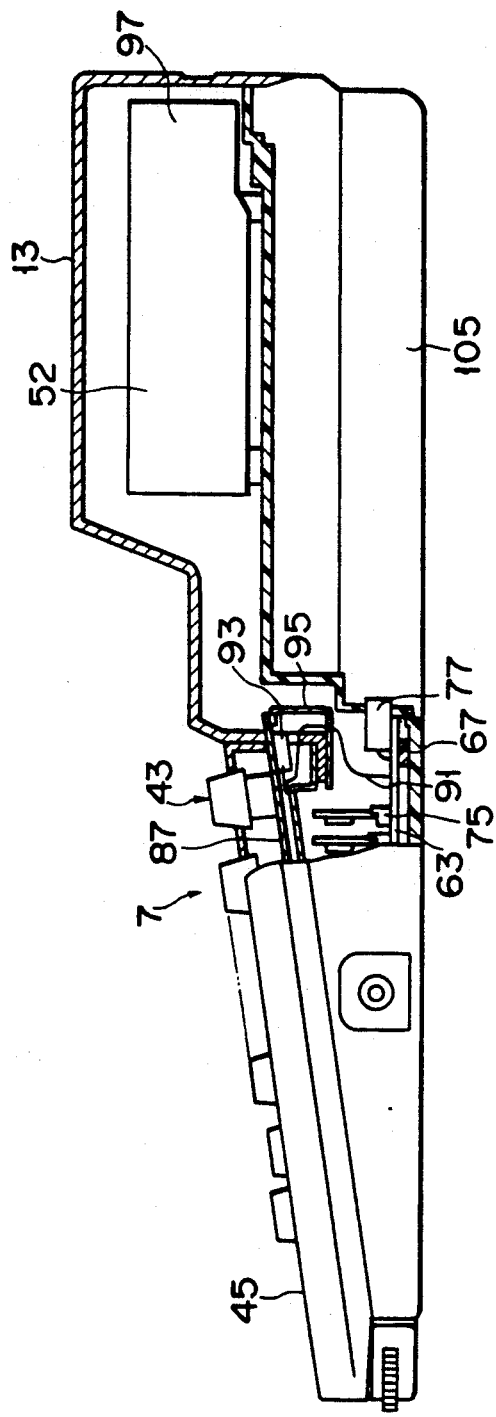

PORTABLE ELECTRONIC APPARATUS WITH A LATCH MECHANISM INCLUDING AN INTERLOCK

BACKGROUND OF THE INVENTION

1. Field of the Invention

The present invention relates to portable electronic apparatuses such as laptop computers, word processors, etc.

2. Description of the Related Art

Portable computers, called laptop computers, have recently been spreading for general use. The computers of this type comprises a housing and a display unit rockably mounted thereon. The display unit is put on the housing when not in use, and is rocked to an operating position when it is to be operated.

Conventionally, a portable computer has a software-based function to prevent wrong operation. Although this preventive function provides a certain measure of effect, it may possibly be nullified when the computer itself is ready for operation.

Since a large number of heating components are arranged in the computer housing, the computer is generally provided with a cooling mechanism. This cooling mechanism includes, for example, a cooling fan arranged in the housing. After the components are cooled by means of the outside air, which is introduced into the housing through intake ports in the housing by means of the fan, the air is discharged through exhaust ports formed in the housing.

In consideration of its portability, however, the portable computer is made as light in weight and compact as possible. It is difficult, therefore, to secure wide enough opening areas for the intake and exhaust ports in the housing, so that sufficient cooling air cannot be easily introduced into the housing. Further, the cooling fan produces relatively great operating sounds, which result in undesired noises.

Since the housing of the portable computer is compact, as described above, a large number of components must be efficiently arranged in the housing.

The portable computer is provided with a substantially rectangular keyboard unit, which is mounted on the housing so that its peripheral edge portion is supported thereby. If keys of the keyboard unit, especially the ones situated in the central portion of the keyboard unit, are deeply depressed, therefore, the central portion of the keyboard unit sometimes may bend in the direction of the depression. In such a case, the keyboard unit interferes with underlying electronic parts, thereby possibly damaging them.

Some conventional portable computers are provided with an expansion unit which can contain an expansion component for expanding the function of the computer. This expansion unit is removably mounted on the housing. In attaching the expansion unit to the housing, a unit-side connector is connected to a housing-side connector. In order to connect these two connectors with accuracy, they must be accurately positioned with respect to each other. Accordingly, the expansion unit and the housing should be manufactured with high accuracy, thus entailing increased costs.

SUMMARY OF THE INVENTION

The present invention has been conceived in consideration of these circumstances, and its object is to provide a portable electronic apparatus capable of securely preventing wrong use.

Another object of the invention is to provide a portable electronic apparatus whose heating components can be efficiently cooled.

Still another object of the invention is to provide a portable electronic apparatus in which parts can be set efficiently utilizing the inside space of a housing.

A further object of the invention is to provide a portable electronic apparatus in which a keyboard unit can be prevented from bending so that parts will not be damaged thereby.

A still further object of the invention is to provide an electronic apparatus in which an expansion unit can be securely connected to the electronic apparatus with use of a simple structure.

In order to achieve the above objects, an electronic apparatus according to an aspect of the present invention is designed so that inadvertent or accidental opening of display unit is mechanically prevented. More specifically, the electronic apparatus comprises a housing, input means mounted on the housing, and a display unit arranged on the housing and rotatable between a closed position in which the input means is covered by the display unit and a desired rotated position in which the input means is exposed. The display unit includes latch means which engages the housing to keep the unit in the closed position when the unit is rotated to the closed position. The latch means includes a latch hook, movable between a latch position and a release position, and an interlocking member movable to interlock with the latch hook. The display unit is provided with key means for restraining the movement of the interlocking member.

If the key means is turned on with the display unit in the closed position, according to the arrangement described above, the display unit cannot be lifted from the housing, so that the electronic apparatus itself is disabled from operating.

An electronic apparatus according to another aspect of the present invention comprises a circuit board mounted with a heating component, a housing containing the circuit board and the heating component and having a wall portion inclined with respect to the circuit board, and cooling means provided at the housing, for cooling the inside of the housing. The cooling means includes a cooling fan arranged in the housing, and intake ports formed in the wall portion.

Since the wall portion is inclined in this manner, according to this arrangement, intake ports with a larger cross-sectional area can be formed in the wall portion than in the case where intake ports are formed in a wall portion of the same height which extends perpendicular to the circuit board. Even though the wall portion is lowered in profile so that the housing is compact, intake ports with a larger cross-sectional area can still be formed and sufficient cooling air can be guided into the housing through the ports.

Further according to the present invention, the housing of the electronic apparatus includes a wall portion which, facing the exhaust side of a cooling fan, has a plurality of exhaust ports through which the air from the fan is discharged from the housing. Guide ribs with a streamlined cross section, which extend along the respective end edges of the exhaust ports, are formed at least on those parts of the wall portion which face the fan.

With use of these guide ribs, in this arrangement, the air discharged from the cooling fan can be smoothly guided into the exhaust ports and smoothly discharged from the housing. Thus, the cooling efficiency inside the housing can be improved.

According to the electronic apparatus of the present invention, furthermore, cooling means for cooling the inside of a housing of the apparatus includes a cooling duct, having an intake portion and an exhaust portion and arranged in the housing, heating components being located in the cooling duct, and a cooling fan opposed to the exhaust portion of the cooling duct, for sucking air from the intake portion through the duct. Spacing means is arranged between the cooling fan and the exhaust portion to keep the fan at a predetermined distance from the exhaust portion.

In this arrangement, the cooling fan is kept at the predetermined distance from the exhaust portion of th cooling duct by means of the spacing means, so that eddies in the exhaust portion of the duct can be reduced. Thus, the intake efficiency of the cooling means can be improved, and the noise level of the fan can be lowered.

An electronic apparatus according to still another aspect of the present invention comprises a housing having a bottom wall, and a keyboard unit removably mounted on the housing and inclined to the bottom wall. The keyboard unit is connected electrically to a circuit board in the housing by means of a connecting cable. One end of the cable is fixed to circuit substrate, and the other end is removably connected to a connector which is attached to the keyboard unit. The connector is situated within a region in which the distance between the keyboard unit and the bottom wall of the housing is greatest.

According to the electronic apparatus constructed in this manner, the connector for the connecting cable is situated within the region in which the distance between the inclined keyboard unit and the bottom wall of the housing is greatest, so that this region, which is liable to be a dead space, can be effectively utilized. Also, there is no need of securing a space for the connector over the circuit board in the housing. Thus, the housing can be made more compact.

An electronic apparatus according to a further aspect of the present invention comprises a housing having a bottom wall carrying a circuit board thereon, and a substantially rectangular keyboard unit mounted on the housing and facing the circuit board. The peripheral edge portion of the keyboard unit is supported on the housing, and support posts protrude from the central portion of the unit toward the circuit board. The respective extended ends of the posts rest on the circuit board.

According to the electronic apparatus constructed in this manner, even if keys situated in the central portion of the keyboard unit are deeply depressed, the keyboard unit can be prevented from bending by the agency of the support posts. Thus, parts under the keyboard unit can be prevented from being damaged.

An electronic apparatus according an additional aspect of the present invention comprises a housing having a storing section opening to the outer surface thereof, a circuit board arranged in the housing, a first connector fixed to the circuit board and exposed to the inside of the storing section, and an expansion unit removably fitted to the storing section so as to constitute part of the outer surface of the housing. The expansion unit includes means for expanding the function of the electronic apparatus, a second connector connected to the first connector, and a supporting member for supporting the second connector. The supporting member is provided on the expansion unit so as to be movable in a direction substantially perpendicular to the connecting direction of the first and second connectors.

According to the electronic apparatus constructed in this manner, if the second connector is slightly displaced with respect to the first connector when the expansion unit is fitted in the storing section of the housing, the second connector can be accurately positioned with respect to the first connector by moving the supporting member, so that the second connector can be securely connected to the first connector. Since the two connectors can be securely connected to each other with use of such a simple structure, the expansion unit and the housing need not be manufactured with very high accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 to 15 show a portable computer according to an embodiment of the present invention, in which FIG. 1 is a perspective view of the computer with its display unit open, FIG. 2 is a perspective view of the computer with its display unit closed, FIG. 3 is a sectional view of the computer, FIG. 4 is an exploded perspective view showing the front portion of the computer, FIG. 5 is a perspective view of the computer with its top cover off, FIG. 6 is cutaway side view showing a cooling fan and exhaust ports, FIG. 7 is an enlarged perspective view showing the exhaust ports and members associated therewith, FIG. 8 is a bottom view of the computer, showing a storing section for an expansion box, FIG. 9 is a perspective view showing the expansion box, FIG. 10 is a perspective view showing a latch mechanism, FIG. 11 is an exploded perspective view of a latch hook, FIG. 12 is a perspective view of the latch hook, FIG. 13 is a schematic sectional view of the front portion of the computer, showing a state in which a latch hook is in engagement with a latch hole, FIG. 14 is schematic sectional view of the front portion of the computer, showing a state in which the latch hook is disengaged, and FIG. 15 is a sectional view corresponding to FIG. 13, showing the positional relationship between a dial key and the latch mechanism; and FIG. 16 is a side view, partially in section, showing a computer according to a modification of the present invention.

DETAILED DESCRIPTION OF THE PREFERRED EMBODIMENTS

Figure 3:
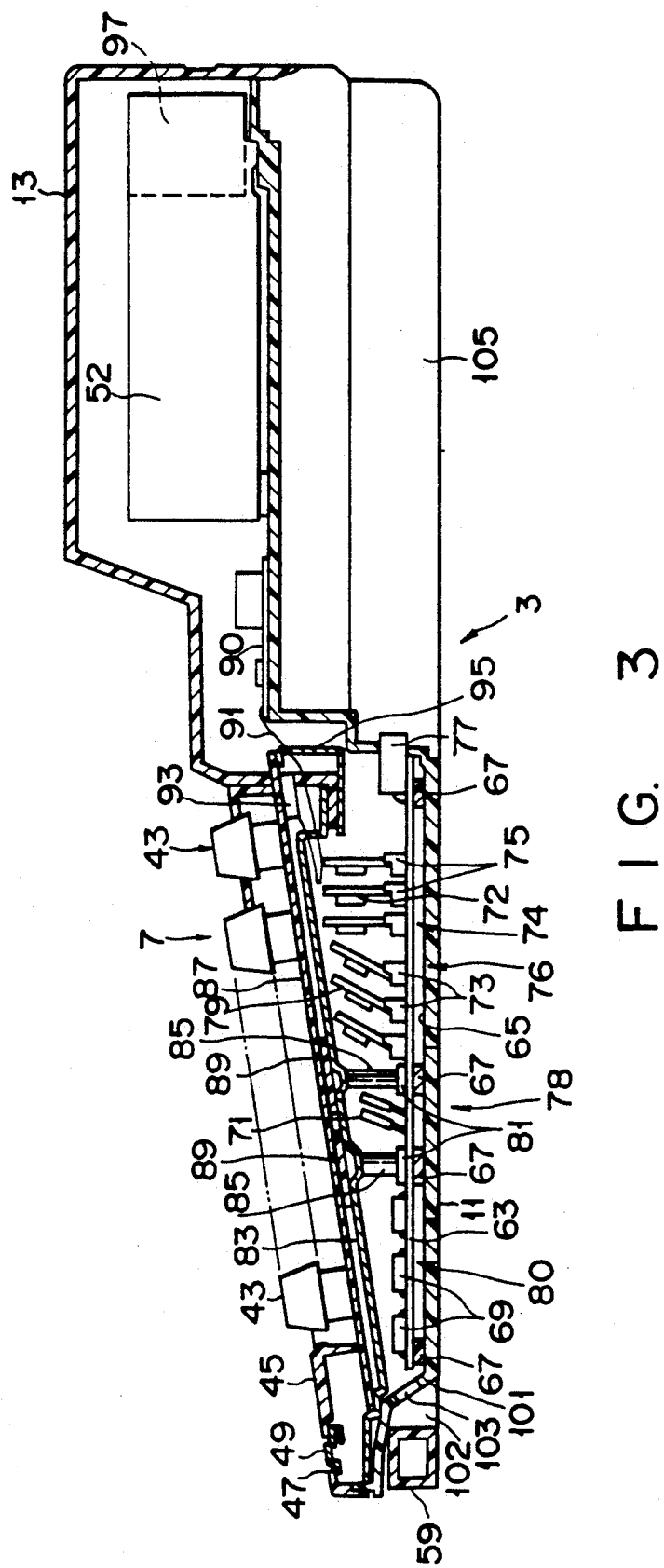

A portable computer according to an embodiment of the present invention will now be described with reference to the accompanying drawings.

As shown in FIGS. 1 and 2, the computer 1 comprises a base unit 3, for use as a housing, and a display unit 5. A substantially rectangular keyboard unit 7 is mounted on the upper surface of the front portion of the unit 3. An expansion box 9 is attached to the bottom portion of the rear portion of the unit 3. A handle 17 is slidably attached to the front end of the base unit 3. An operator can hold the handle 17 as he or she carries the computer 1. The handle 17 has a grip section 59 and a pair of leg sections 61 slidably mounted on the base unit 3.

The base unit 3 includes a substantially rectangular bottom case 11 and a rear top cover 13 concealing the rear portion of the case 11. A top wall of the cover 13 is stepped so that its front side is recessed, and a recess 27, opening upward and forward, is formed in the center of the stepped portion. A socket 15, which is arranged in the recess 27, is rockably mounted on the top cover 13. A cable guide duct 19 is rockably fitted in the lower part of the socket 15. The duct 19 serves to guide cables which are led out from the base unit 3 into the display unit 5. The guide duct 1 is fixed in the recess 27 of the top cover 13. The detailed structure of the guide duct 19 is disclosed in U.S. Pat. No. 4,864,523.

A leg section 37 of the display unit 5 is fitted in and screwed to the socket 15. A decorative cover 25 is attached to the upper portion of the front face of the socket 15. The cover 25 conceals tapped holes which are used to fix the socket 15 and the display unit 5. The construction of the cover 25 are described in detail in U.S. patent application Ser. No. 07/598,519 filed Oct. 17, 1990. The display unit 5 can be disengaged from the socket 15 by taking off the cover 25 and then removing screws which are used to fix the socket 15 and the unit 5. The construction of a hinge mechanism for the display unit 5 are described in detail in U.S. patent application Ser. No. 07/428,772 filed Oct. 30, 1989. The display unit 5 and the base unit 3 are grounded through the socket 15. The construction of a grounding mechanism for this purpose are described in detail in U.S. patent application Ser. No. 07/576,650 filed Sep. 5, 1990.

A number of intake ports 21 for introducing cooling air into the base unit 3 are bored in the rear portion of the right-side wall of the top cover 13, and a number of exhaust ports 23 (see FIG. 7) are bored in the rear portion of the left-side wall of the top cover 13. A plurality of LED lamps 29 ar arranged each extending from the upper edge of the stepped portion of the cover 13, on one side thereof, to the upper surface. The lamps 29 serve to inform the operator of the operating state of the portable computer 1. A burglarproof hook (not shown) for the computer 1 is provided on the left side face of the base unit shown in FIG. 1. This burglarproof hook is described in detail in Published Unexamined Japanese Utility Model Application No. 2-65384.

The display unit 5 includes a liquid crystal display (LCD) 31, a base frame 33 for fixedly holding the LCD 31, and a display cover 35 for concealing all the area of the LCD 31 except the display screen thereof The leg section 37, which is removably fitted in the socket 15, is formed integrally with the base frame 33. The display unit 5 is rotatable integrally with the socket 15 between a rotated position in which it is inclined at a desired angle to the base unit 3, as shown in FIG. 1, and a closed position in which it conceals the keyboard unit 7, as shown in FIG. 2. A pair of latch hooks 39 are provided individually at the opposite ends of the upper portion of the base frame 33. A large number of intake slits 41 are formed at the bottom end of the display cover 35. Cooling air is introduced into the display unit 5 through the slits 41. In the display unit 5, converters (not shown) are provided individually on the opposite side faces of the LCD 31. The converters are used to boost a low voltage fetched from the base unit 3 through the socket 15 to a high voltage. A mounting structure for the converters is described in detail in U.S. patent application Ser. No. 07/577,535 filed Sep. 5, 1990.

The keyboard unit 7 includes a keyboard body 43 and a keyboard frame 45 which holds the body 43 so as to conceal the body except keys. A pair of latch holes 47 are formed at the front portion of the upper surface of the keyboard frame 45. The latch hooks 39 of the display unit 5 are adapted to engage the holes 47, individually. Hole covers 49 are rockably mounted on the inner surface of the frame 45. They are adapted to close their corresponding latch holes 47 when the hooks 39 are disengaged from the holes 47.

A combination lock 55 is provided substantially in the center of the top edge of the display unit 5. It serves to restrict the movement of the latch hooks 39, thereby locking the display unit 5 in the closed position shown in FIG. 2. A large number of exhaust slits 57 are formed covering both side faces and rear face of the base frame 33 of the display unit 5. Air can be discharged from the unit 5 through the slits 57 so that the inside of the unit 5 is cooled.

A floppy disk drive (FDD), an expansion board, a modem card, etc. are contained in the expansion box 9. The box 9 is attached to the bottom case 11 of the base unit 3 by means of screws. A loading slot 53 for a floppy disk is formed in that side wall of the expansion box 9 which constitutes part of a side wall of the base unit 3.

Figure 4:
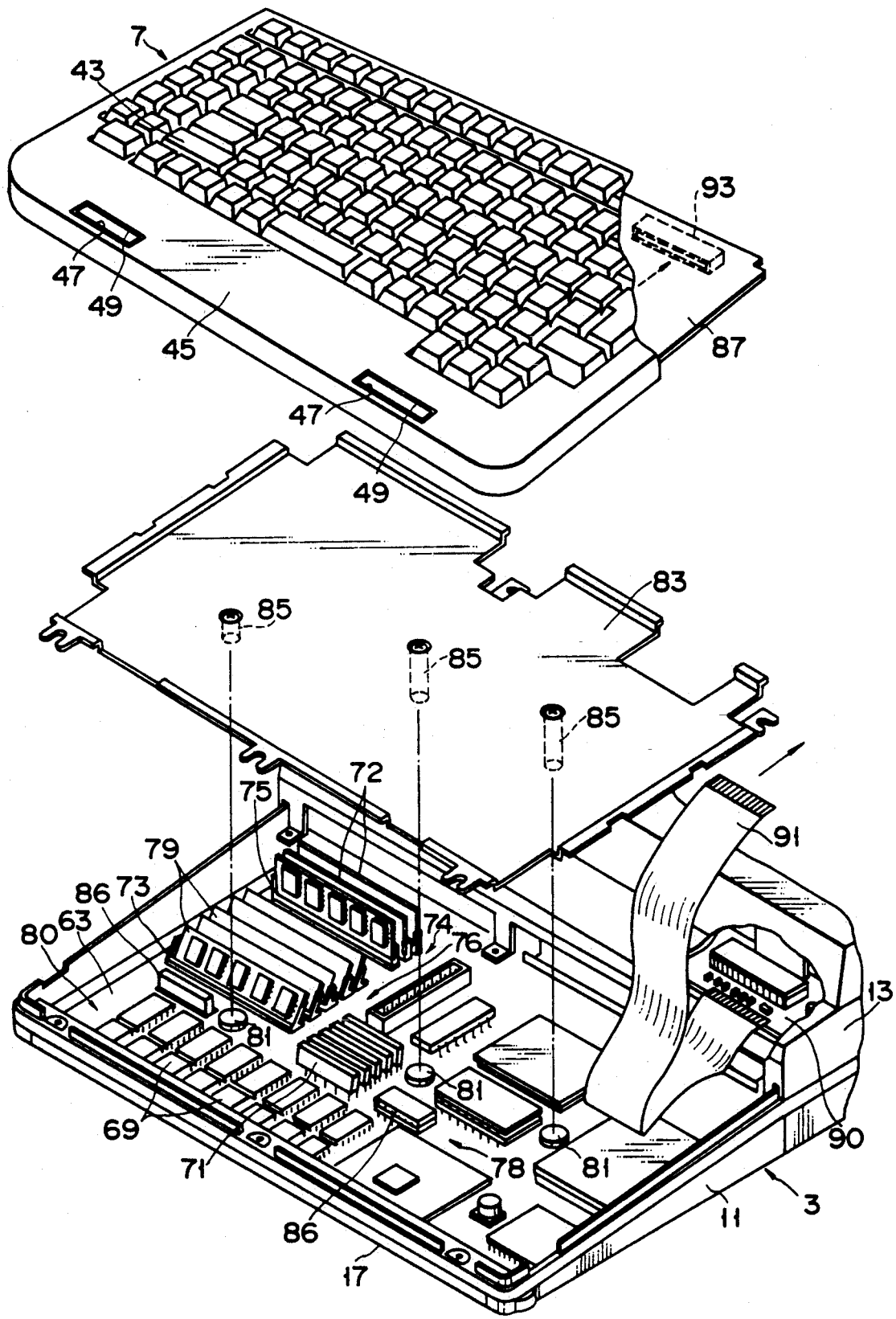

FIGS. 3 and 4 are views for illustrating the arrangement of parts in the base unit 3.

A main printed circuit board (PCB) 63 is mounted on the bottom surface of the bottom case 11 of the base unit 3 so as to face the keyboard unit 7. The bottom surface of the case 11 constitutes a bearing surface 65 of the present invention. A plurality of bosses 67 are formed on the bearing surface 65, and the main PCB 63 is mounted on the bosses 67. The PCB 63 is mounted with a large number of electronic parts, including SOJ-type memory elements 69 surface-mounted on the PCB 63, pin-mounted ZIP-type memory elements 71, and DIP-type memory elements 86. The electronic parts further include inclined SIMM sockets 73, upright SIMM sockets 75, a first connector 77 to which a connector in the expansion box 9 is connected, and SIMMs 79 and 72 fitted to the sockets 73 and 75. A plurality of circular shock-absorbing rubbers 81, e.g., three in number, are fixed to the central portion of the upper surface of the PCB 63. Each rubber 81 is situated just over its corresponding boss 67 of the bottom case 11.

A shielding plate 83 for magnetically shielding the main PCB 63 is mounted on the front portion of the bottom case 11 and situated between the keyboard unit 7 and the PCB 63, thereby covering the PCB 63. Columnar support posts 85 are screwed to the shielding plate 83, extending therefrom toward the PCB 63. These posts 85 are situated corresponding individually to the rubbers 81 on the main PCB 63 s that their respective lower ends rest on their corresponding rubbers.

The body 43 of the keyboard unit 7 has a rectangular substrate or a circuit board 87 which carries a large number of keys thereon. The circuit board 87 is situated adjacent and parallel to the shielding plate 83. The keyboard frame 45 is fitted to the upper end edge of the front portion of the base unit 3. Shock-absorbing rubbers 89 are pasted individually on those portions of the lower surface of the keyboard substrate 87 which are situated right over the support posts 85.

Thus, the shielding plate 83, which is situated under the keyboard unit 7, has the support posts 85 which project toward the PCB 63 and whose respective lower ends rest individually on the rubbers 81 on the PCB. Even if the keys in the central portion of the keyboard unit 7 are deeply depressed, therefore, the central portion of the plate 83, along with the keyboard substrate 87, can be prevented from bending toward the PCB 63. Thus, the shielding plate 83 can be prevented from damaging the electronic parts on the PCB 63 by running against them. By the use of the shock-absorbing rubbers 81 and 89 on the bottom and top of the each support post 85, the impact of the deflection of the keyboard on the main PCB 63 can be reduced.

The keyboard unit 7 is connected electrically to a circuit board 90 on the side of the base unit 3 by means of a flat cable 91. A connector 93 is fixed to the rear end of the lower surface of the keyboard substrate 87 on the side of the top cover 13. One end of the cable 91 is removably connected to the connector 93. The other end of the cable 91 is soldered directly to the circuit board 90. The board 90 is fixed in the bottom case 11, and is situated below the rear top cover 13.

The flat cable 91 can be disconnected from the keyboard unit 7 at the location of the connector 93 which fixed to the lower surface of the keyboard substrate 87, as described above. In removing the unit 7 from the base unit 3, therefore, the top cover 13 need not be removed from the bottom case 11, so that the efficiency of operation for assembling or disassembling the apparatus is improved.

As shown in FIG. 16, the other end of the flat cable 91 may be soldered to the main PCB 63 which is situated under the keyboard unit 7. In this case, just as in the aforesaid case, the flat cable 91 can be disconnected from the keyboard unit at the location of the connector 93. In removing the unit 7 from the base unit 3, therefore, the top cover 13 and the shielding plate 83 need not be removed from the bottom case 11, so that the efficiency of operation for assembling or disassembling the apparatus is improved.

In FIGS. 3 and 16, reference numeral 95 denotes a reinforcing plate 95 for reinforcing the base unit 3, which is located substantially in the central portion o the bottom case 11.

The keyboard unit 7 of the present embodiment is declined forward or toward the operator to facilitate the operator's keyboard operation, as shown in FIGS. 3 and 4. Therefore, the keyboard substrate 87 and the shielding plate 83 are declined in like manner. The plate 83 constitutes a slanting surface of the present invention.

In the base unit 3 constructed in this manner, the distance between the shielding plate 83 and the PCB 6 is greatest in the vicinity of the center of the unit 3, and decreases toward the front end of the unit 3. In order to mount the electronic parts in the base unit 3 with high efficiency and with high density, therefore, the upright SIMM sockets 75 are arranged in a first region 74 of the main PCB 6 where the distance between the PCB 63 and the shielding plate 83 is greatest. These sockets 75, which are arranged adjacent and parallel to one another, extend in the transverse direction of the base unit 3. The SIMMs 72 are removably fitted to the sockets 75 and extend substantially at right angles to the PCB 63. Each SIMM 72 has an elongated rectangular substrate and a plurality of memory elements arranged on the substrate in the longitudinal direction thereof. The inclined SIMM sockets 73 are arranged in a second region 76 of the main PCB 63 which is situated on the front end side of the base unit 3 with respect to the first region 74, and in which the distance between the PCB 63 and the shielding plate 83 is shorter than in the first region. These sockets 73, which are arranged adjacent and parallel to one another, extend in the transverse direction of the base unit 3. The SIMMs 79 similar to the SIMMs 72 are removably fitted to the sockets 73 and inclined at a predetermined angle to the main PCB 63 in the same direction as the shielding plate 83. In the present embodiment, the SIMMs 79 are inclined at an angle greater than the angle of inclination of the shielding plate 83, with respect to the PCB 63. However, this angle of inclination of the SIMMs 79 may be suitably set depending on the required mounting density.

The SIMMs 72 and 79, which have the same size and shape with one another, are attached to their corresponding sockets 75 and 73 in a manner such that the longer sides of their respective substrates extend parallel to the PCB 63 and the shielding plate 83.

In the first region 74 of the main PCB 63, as described above, the SIMMs 72 are mounted upright, so that the mounting density of the parts is very high. In the second region 76 where the SIMMs 79 cannot be mounted upright, on the other hand, the SIMMs 79 are inclined in the same direction as the shielding plate 83. Although the mounting density in this region is lower than that in the first region, therefore, the parts can be mounted with the highest possible mounting density in consideration of the distance between the PCB 63 and the plate 83.

The ZIP-type memory elements 71, the DIP-type memory elements 86, etc. are mounted in a third region 78 of the main PCB 63 which is situated on the front end side of the base unit 3 with respect to the second region 76, and in which the distance between the PCB 63 and the shielding plate 83 is shorter than in the second region. Further, the SOJ-type memory elements and other low-profile elements are mounted in a fourth region 80 of the main PCB 63 in which the distance between the PCB 63 and the shielding plate 83 is shorter than in the third region 78.

According to the portable computer constructed in this manner, the parts are disposed in the individual regions of the main PCB 63, and the upright SIMM sockets 75 and the inclined SIMM sockets 73 are properly used, depending on the distance between the PCB 63 and the shielding plate 83. Although the distance between the PCB 63 and the shielding plate 8 decreases from the central portion of the base unit 3 toward the front end portion thereof, therefore, the parts can be arranged without substantially lowering the mounting density.

As mentioned before, the connector 93 for electrically connecting the keyboard unit 7 and the circuit board 90 is fixed to the rear end portion of the lower surface of the keyboard substrate 87. Thus, the connector 93 is situated in that position in the region between the keyboard unit 7 and the PCB 63 where the distance between the two components is greatest, so that the aforesaid region, which is liable to be a dead space, can be effectively utilized. Further, a setting space for the connector 93 need not be secured over the circuit board in the base unit 3, so that the degree of freedom of the circuit design can be improved, and the apparatus can be made more compact.

Figure 5:
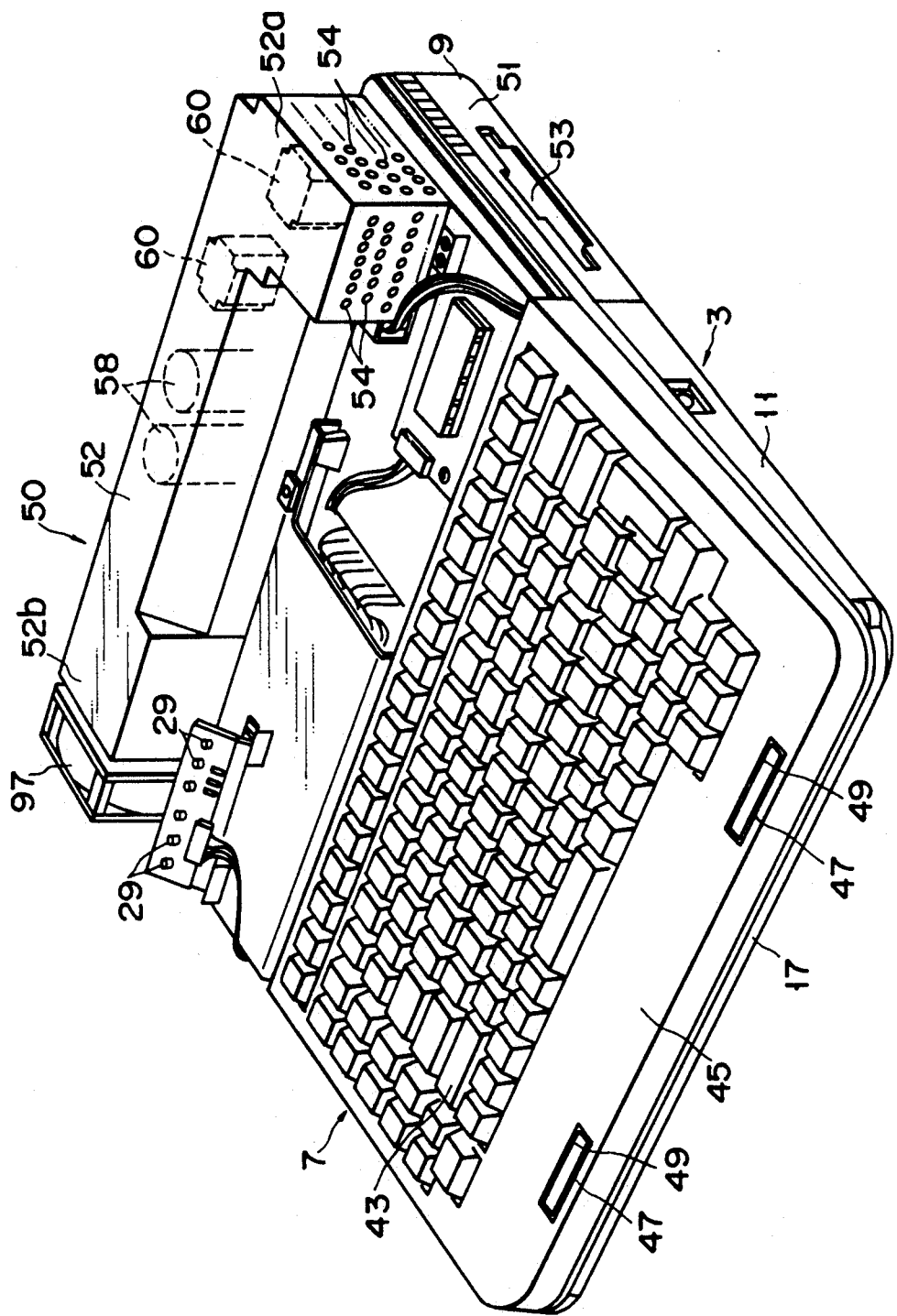
Figure 6:
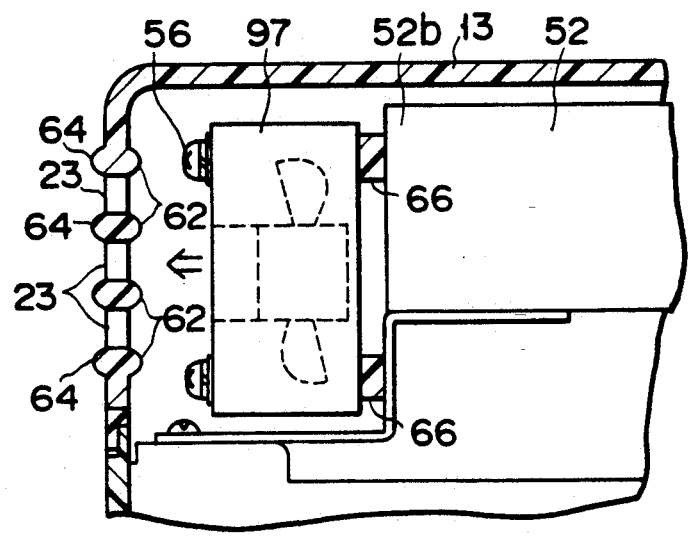

As shown in FIGS. 3, 5 and 6, the computer is provided with a cooling mechanism 50 for cooling heating components in the housing. The mechanism 50 includes a cooling duct 52 which extends substantially across the full width of the base unit 3 in the rear end portion thereof. The duct 52 contains capacitors 58, transformers 60, etc., which constitute a driving power sources and radiate substantial heat. An intake end 52a of the duct 52 is closed, and a large number of intake ports 54 are formed in the end wall of the duct. Some of the ports 54 face the intake ports 21 in the right-hand side wall of the top cover 13, while the others open toward the keyboard unit 7. An exhaust end 52b of the duct 52 is open, and a cooling fan 97 is arranged facing the exhaust opening. The exhaust side of the fan 97 faces the exhaust ports 23 in the left-hand side wall of the cover 13.

The fan 97 is fixed to the exhaust end 52b of the duct 52 by means of a plurality of screws 56. Spacers 66 are fixed between the duct 52 and the fan 97 by means of the screws 56, whereby the fan 97 is kept at a predetermined distance from the exhaust end of the duct.

Figure 7:
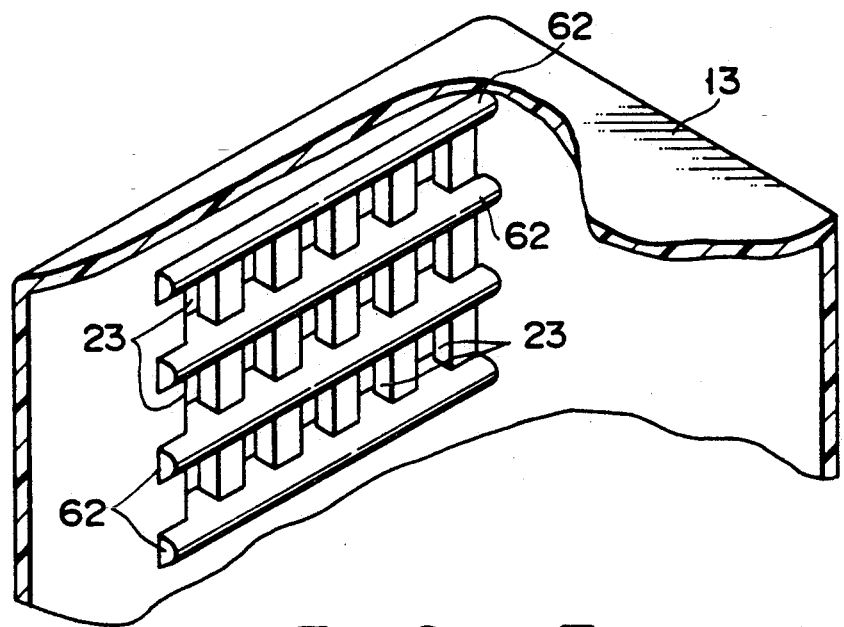

As shown in FIGS. 6 and 7, a plurality of parallel guide ribs 62 are formed on the inner surface of the left-hand side wall of the top cover 13 which faces the exhaust side of the cooling fan 97. The ribs 62, which extend substantially in the horizontal direction, are arranged at predetermined intervals. Each rib 62 has a streamlined cross-sectional shape. The exhaust ports 23 are formed between each two adjacent guide ribs 62, and are arranged in the extending direction of the ribs. Guide ribs 64, which resemble the guide ribs 62, are formed on the outer surface of the left-hand side wall of the top cover 13 so as to face the ribs 62, individually.

As shown in FIG. 3, a large number of intake slits 103 are formed in a front end wall 101 of the bottom case 11 and arranged in the transverse direction of the base unit 3. Each slit 103 extends in parallel to the circuit board 63. Cooling air is introduced into the unit 3 through the slits 103. Since the keyboard unit 7 is declined forward, as mentioned before, the front end wall 101 is lower than the other portions of the base unit 3, and it is hard to form intake slits with a wide opening area in the wall 101. Accordingly, the front end wall 101 is declined forward with respect to the bottom wall of the bottom case 11. If the intake slits 103 are formed in the wall 101 inclined in this manner, their opening area can be made wider than in the case where the slits are formed in a front end wall which extends at right angles to the bottom wall. Thus, the amount of intake air can be increased for higher cooling efficiency.

Since the front end wall 101 is inclined, moreover, a recess 102 is defined between the wall 101 and the grip section 59 of the handle 17. The recess 102 can be utilized as a finger recess which makes it easy to draw out the handle 17 from the base unit 3.

When the cooling fan 97 is actuated, in the cooling mechanism 50 constructed in this manner, the outside air is introduced into the base unit 3 through the intake ports 21 of the top cover 13. The introduced air flows into the cooling duct 52 through the intake ports 54 thereof, thereby cooling the heating parts 58, 60 in the duct, and is then guided to the fan 97. Further, the air is discharged to the outside through the exhaust ports 23 of the top cover 13.

At the same time, the outside air is introduced into the base unit 3 through the intake slits 103 in the front end wall 101 of the unit 3. After cooling the electronic parts on the main PCB 63, some of the air is guided to the cooling fan 97 through the intake ports 54 of the cooling duct 52 and the inside of the duct, and the remainder is delivered directly to the fan. Thereafter, the introduced air is discharged to the outside through the exhaust ports 23 by means of the fan 97.

In this manner, the heating components in the base unit 3 are cooled by means of the introduced outside air. The guide ribs 62 and 64 are formed along the side edges of the exhaust ports 23, on the in- and outflow sides thereof, respectively. Each rib has a streamlined cross-sectional shape. Therefore, the flow of the air discharged from the cooling fan 97 can be directed by means of the guide ribs 62 and 64 and smoothly guided to the exhaust ports 23. Thus, the exhaust efficiency is improved, so that the cooling efficiency inside the base unit 3 is improved. A satisfactory effect can be obtained if the guide ribs are formed at least on the inflow side of the exhaust ports 23, and the guide ribs 64 on the outflow side may be omitted. Moreover, these guide ribs may be formed on the side of the intake ports 21 as well as on the side of the exhaust ports 23. In this case, the intake efficiency can be improved.

As mentioned before, the cooling fan 97 is kept at the predetermined distance from the exhaust end of the cooling duct 52 by means of the spacers 66. Therefore, eddies in the exhaust end portion 52b of the duct 52 can be reduced, so that the intake efficiency of the fan 97 can be improved, and the noise level of the fan can be lowered.

Figure 8:
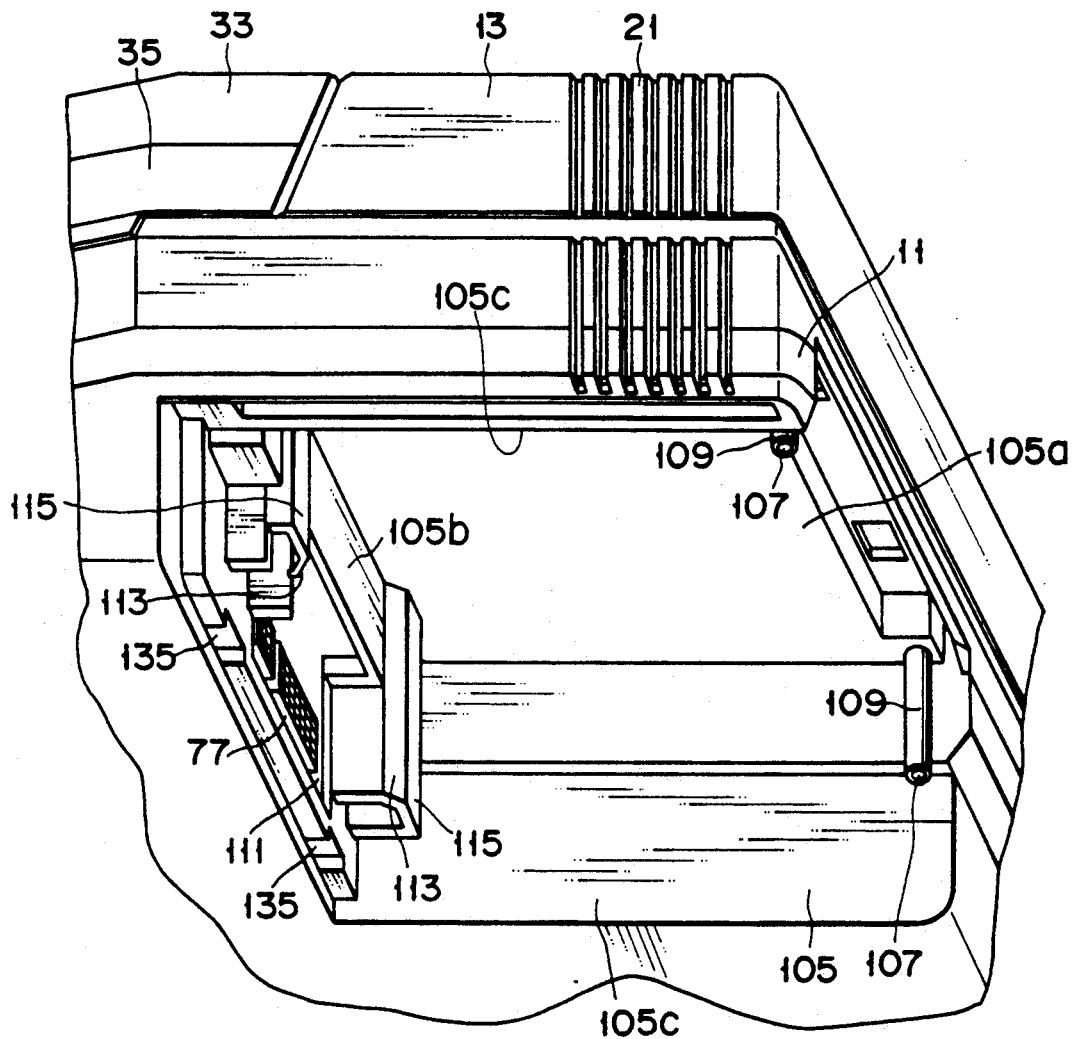

As shown in FIGS. 3 and 8, the bottom case 11 is formed having a storing section 105 which is fitted with the expansion box 9. The section 105, which is located at the rear end portion of the case 11, is formed of a substantially rectangular recess opening on the bottom surface, rear face, and right-hand side face of the case. This recess is defined by a substantially horizontal bottom wall 105a, a vertically extending front wall 105b, and a pair of side walls 105c. These walls are formed integrally with the bottom cover 11. A pair of bosses 109 vertically protrude from the rear end portion of the bottom wall 105a. The extended end of each boss 109 has a tapped hole 107 to mate with a screw for fixing the rear portion of the expansion box 9. The front wall 105b has an opening 111 which opens into the base unit 3. The first connector 77 attached to the main PCB 63 is exposed to the opening 111. A pair of vertically extending guide projections 115 are formed on the front wall 105b, on either side of the opening 111. Each projection 115 has a taper face 113 which serves to guide a connector (mentioned later) on the side of the expansion box 9 to the first connector 77. A pair of engaging holes 135 are formed in the front wall 105b, on either side of the opening 111. Hooks of the expansion box 9 are fitted individually into the holes 135 to fix the front end of the box 9 to the base unit 3.

The expansion box 9, which is removably fitted in the storing section 105, is constructed as shown in FIG. 9.

The expansion box 9 is a rectangular structure which has open top and front faces. The floppy disk drive (FDD) 117 is fixed to the central portion of a bottom wall 9a of the box 9. A rectangular circuit substrate 121 is mounted on the front portion of the bottom wall 9a, and the box-side connector 119, for use as a second connector, is fixed to the substrate 121. The connector 119 is to be connected to the first connector 77 which is fixed to the main PCB 63. A pair of bosses 123 protrude individually from the opposite end portions of the front portion of the bottom wall 9a. Each boss 123 has a tapped hole used to screw each end of the substrate 121. A pair of columnar projections 127 protrude from the front portion of the bottom wall 9a so as to be aligned with their corresponding bosses 123. The distal end portion of each projection 127 is D-cut on the sides facing the opposite side plates of the expansion box 9. Thus, the cross section of each projection 127 has the shape of a running track. The respective distal end portions of the projections 127 are fitted individually in a pair of holes 125, which are bored through two corner portions of the substrate 121 situated on a diagonal thereof. A pair of screws 131 are screwed individually into the respective tapped holes of the bosses 123 through holes 129, which are bored through the substrate 121. The screws 131 used are threaded only partially. The diameter of each through hole 129 is greater than that of the shank of each screw 131 and smaller than that of each boss 123. A leaf spring 133 is attached to the near center of the front portion of the bottom wall 9a. The spring 133 electrically connects the substrate 121 and the expansion box 9 and urges the substrate 121 upward. A pair of engaging hooks 137 protrude forward from the front end of the wall 9a. These hooks 137 are fitted individually in the engaging holes 135 in the front wall 105b of the storing section 105, whereby the front end of the box 9 is fixed to the bottom case 11.

The engagement between the D-cut projections 127 and the holes 125 of the substrate 121 and the engagement between the screws 131 and the through holes 129, whose diameter is greater than that of the shank of each screw 131, prevent the circuit substrate 121 from moving in the longitudinal direction of the box 9, that is, in the connecting direction of the connectors 77 and 119, but allow the substrate 121 to move for a predetermined distance in the transverse direction of the box. Further, the engagement between the partially threaded screws 131 and the holes 129 and the action of the leaf spring 133 allow the substrate 121 to move for a predetermined distance in the vertical direction.

Accordingly, the box-side connector 119 fixed to the substrate 121 can move for predetermined distances in the vertical and horizontal directions with respect to the expansion box 9 or the first connector 77 of the base unit 3. Thus, some dimensional error between the connector 77 and the box-side connector 119 is permitted, and the connector 119 can be securely connected to the connector 77 when the box 9 is fitted in the storing section 105. The box-side connector 119 can be disengaged from the connector 77 with a relatively small force, since the substrate 121 has vertical and horizontal plays.

The substrate 121 is mounted with an upward connector 141 connected with an expansion board 139 for use as expanding means, an upward connector 145 connected with a modem card 143, and an upward connector 147 for electrically connecting the FDD 117 to the substrate 121. The board 139 can be replaced with a new one at the operator's request. A second modem card 149 is housed in the rear portion of the expansion box 9. The card 149 is provided with an upward connector 151 for connecting the modem card 143. Bosses 153 are provided at the rear end of the bottom wall 9a of the box 9. Each boss 153 has a hole through which a screw can be fitted into the tapped hole 107 of each corresponding boss 109 of the storing section 105. An exposure window 155 is formed on the rear wall of the expansion box 9. A connector (not shown) attached to the rear end of the expansion board 139 is exposed to the outside through the window 155. Further, a cover 157 is rockably mounted on the rear face of the box 9. When the window 155 is not in use, it is concealed by means of the cover 157.

If necessary, the operator can easily expand the function of the computer by removing the expansion box 9 from the storing section 105 of the base unit 3, connecting the expansion board 139, modem cards 143 and 149, etc. to their corresponding connectors, and then mounting the box 9 again in the storing section 105.

Figure 10:
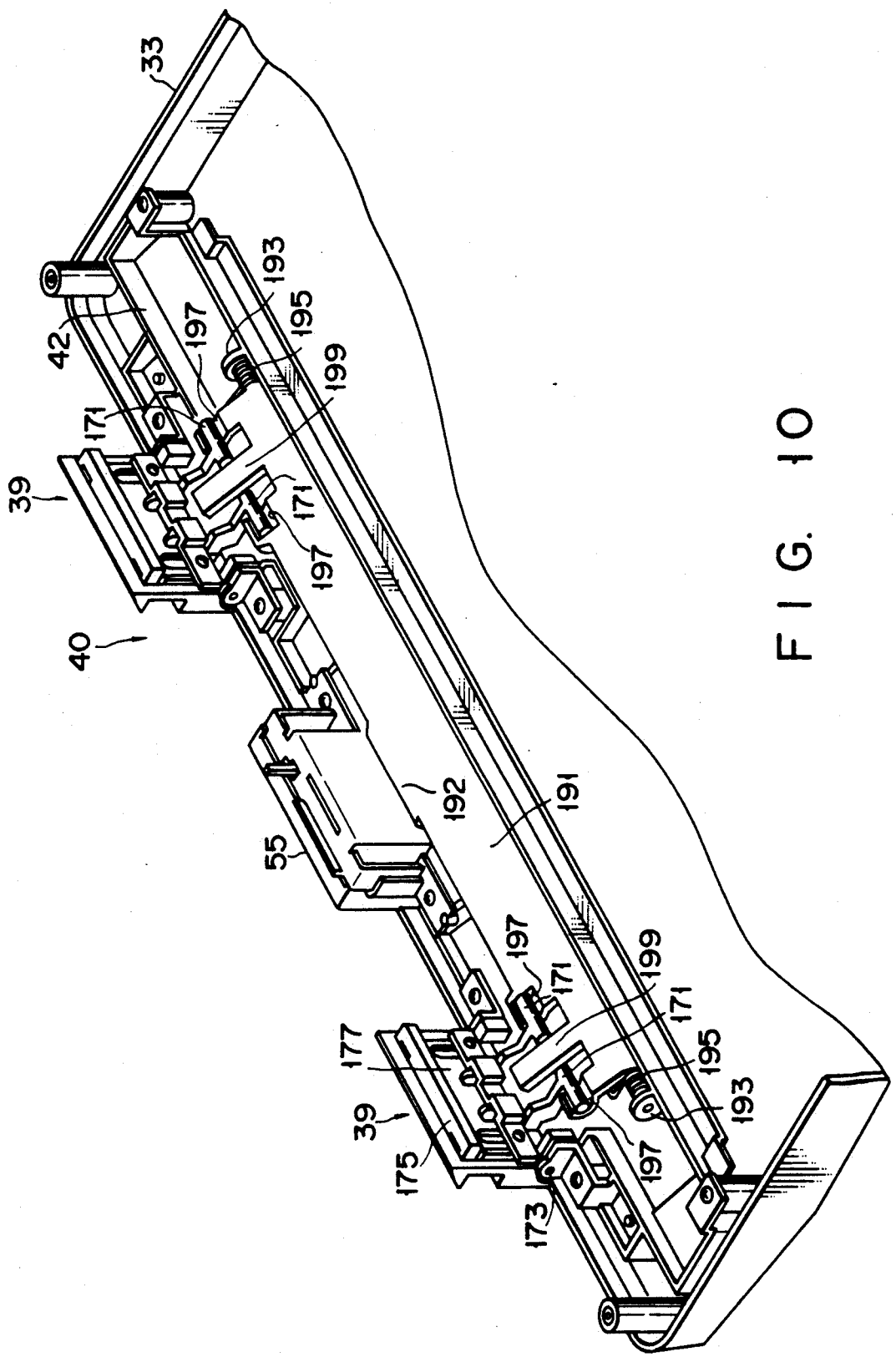
Figure 11:
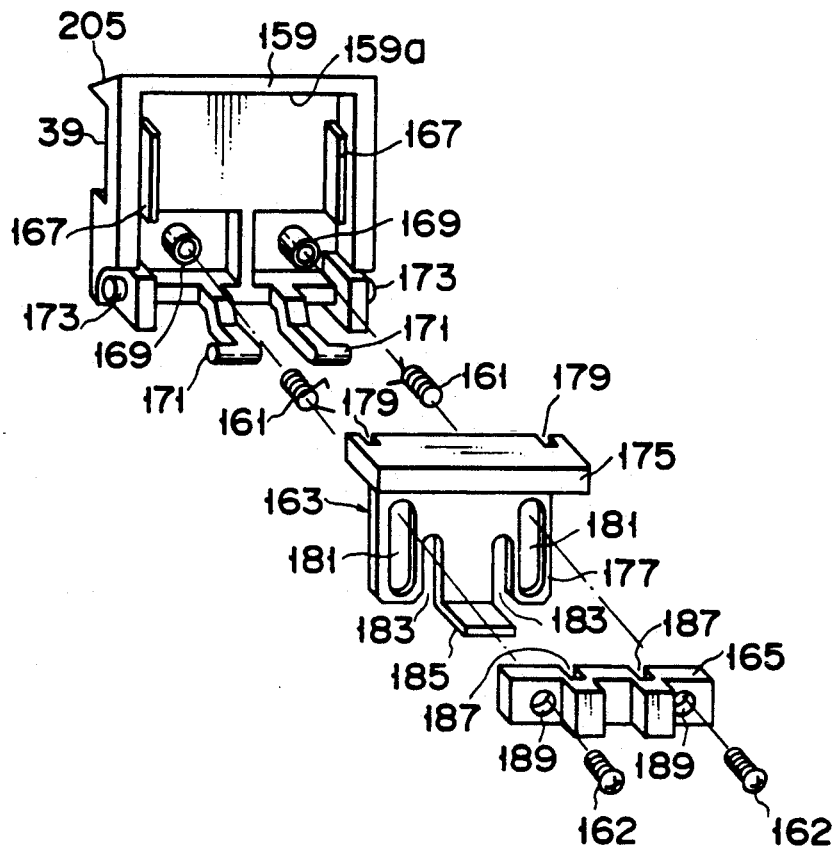

As shown in FIGS. 1 and 10, a latch mechanism 40, which includes the pair of latch hooks 39, is attached to the front end portion of the display unit 5. The mechanism 40 is provided with latch holder 42 which is fixed to the inside of the front end portion of the base frame 33 of the unit 5. The hooks 39 are rockably mounted on the holder 42.

As shown in FIGS. 10 to 13, each latch hook 39 includes a hook body 159, a pair of coil springs 161, a sliding projection 163, and a projection holder 165. The hook body 159 is in the form of a substantially rectangular plate which has a hook portion 205 at its distal end. A rectangular recess 159a is formed in the inner surface of the body 159, and the sliding projection 163, substantially rectangular in shape, is fitted in the recess 159a for vertical sliding motion. The sliding motion of the projection 163 is guided by means of a pair of guide ribs 167 which protrude from the bottom surface of recess 159a. A pair of bosses 169 also protrude from the bottom surface of the recess 159a. Each boss 169 has a tapped hole for a screw 162 used to fix the projection holder 165. The torsion coil spring 161 surrounds each boss 169. A pair of legs 171 protrude rearward from the lower end of the hook body 159, and the respective projected end portions of the legs 171 are outwardly bent in opposite directions. A pair of bosses 173 are formed individually on the opposite side faces of the lower end portion of the hook body 159. The bosses 173 serve as pivot means for the latch hook 39 which rotates relatively to the display unit 5. The bosses 173 are rotatably held by means of the latch holder 42.

The sliding projection 163 includes a substantially rectangular slider plate 177 slidably fitted in the recess 159a of the hook body 159 and a projection body 175 attached to the upper end of the plate 177 and extending perpendicular to the plate 177. The projection body 175 has a pair of guide grooves 179 in which the guide ribs 167 are fitted individually. The slider plate 177 is formed having a pair of first slits 181, adapted to be guided by means of the bosses 169, and a pair of second slits 183 which allow the legs 171 to pass when the plate 177 slides. One end of each coil spring 161 is anchored to its corresponding second slit 183. A tongue 185 protrudes rearward from the lower end of the sliding plate 177 and is situated between the second slits 183.

The projection holder 165 has a pair of third recesses 187 and a pair of holes 189 through which the screws 162 are inserted. When the sliding plate 177 slides, the one end of each coil spring 161 anchored to each second recess 183 gets into its corresponding third recess 187.

Figure 12:
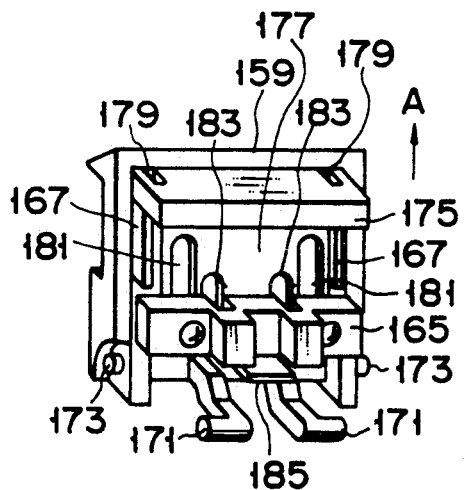

When the hook body 159, coil springs 161, sliding projection 163, and projection holder 165 are assembled together, as shown in FIG. 12, the projection 163 is always subjected to an urging force in the direction of arrow A of FIG. 12 by means of the paired springs 161. When no external force is applied to the latch hook 39, therefore, the sliding projection 163 is held in the illustrated restricted position where the projection body 175 abuts against the upper end face of the recess 159a of the hook body 159 to adjoin the hook portion 205.

Figure 13:
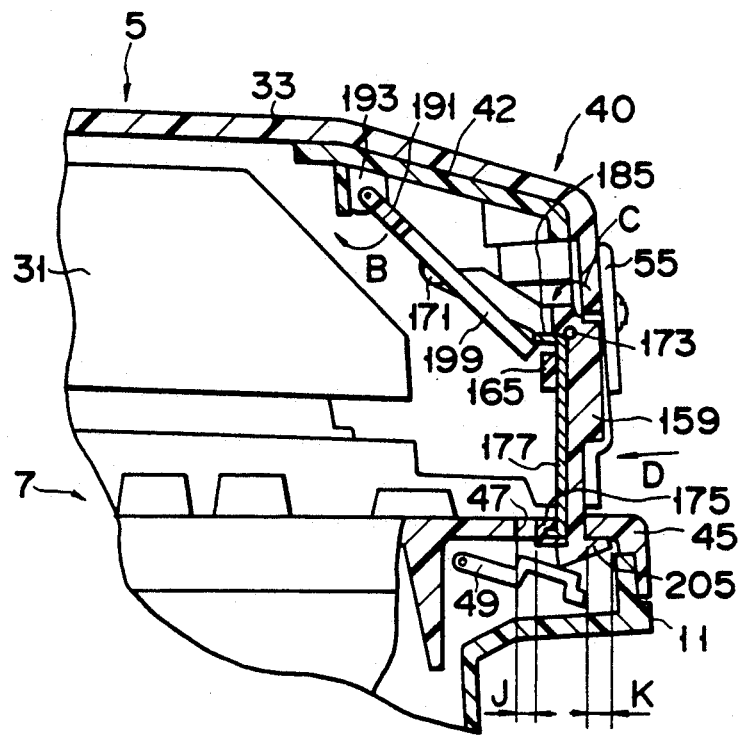

As shown in FIGS. 10 and 13, the latch mechanism 40 includes an elongate control plate 191 for use as an interlocking member which rocks in association with the latch hooks 39. The rocking motion of the hooks 39 is allowed or prevented by the plate 191.

The opposite ends of the control plate 191, which individually face the latch hooks 39, are supported individually by means of a pair of supporting portions 193 of the latch holder 42 for rocking motion. A pair of coil springs 195 are provided individually at the opposite ends of the control plate 191. These springs 195 urge the plate 191 in the direction of arrow B of FIG. 13, that is, in the direction to recede from the latch hooks 39. Each of the opposite end portions of the control plate 191 has a pair of U-shaped grooves 197 and a arm 199 located between the grooves thereof. The grooves 197 extend in the longitudinal direction and coaxial with one another. The legs 171 of each hook body 159 are rotatably fitted in their corresponding grooves 197, and each arm 199 engages the tongue 185 of its corresponding sliding plate 177. The latch control plate 191 presses the latch hooks 39 so that each hook rocks in the direction of arrow C of FIG. 13 around its corresponding bosses 173 by means of the urging force of the springs 195. Each hook 39 engages a stopper (not shown) on the latch holder 42 and held in the illustrated latch position. When no external force is applied to the latch hooks 39, therefore, the plate 191 is kept in its first position shown in FIG. 13.

FIG. 13 shows a state in which the display unit 5 is locked to its closed position by means of the latch mechanism 40. When the unit 5 is rocked to the closed position, each latch hook 39 engages its corresponding latch hole 47 on the upper surface of the front end of the keyboard unit 7. Thus, the hook body 159 and the sliding projection 163 are kept in the latch position and the restricted position, respectively, while the control plate 191 is kept in the first position. In the latch position, the hook portion 205 of the hook body 159 penetrates the latch hole 47 and engages the inner surface of the keyboard frame 45. In the restricted position, the projection body 175 of the sliding projection 163 is situated in the hole 47. The distance J between the body 175 and the rear end edge of the hole 47 is shorter than the length K of engagement between the hook portion 205 and the inner surface of the frame 45. If the latch hook 39 is slightly displaced in the direction of arrow D due to any causes, such as vibration, workmanship errors, etc., therefore, the projection body 175 abuts against the rear end edge of the latch hole 47 before the hook portion 205 is disengaged from the keyboard frame 45, so that the hook 39 is restrained from being further displaced. Thus, there is no possibility of the latch hook 39 being unexpectedly disengaged from the latch hole 4 to render the display unit 5 unlatched.

In releasing the latch mechanism 40 to unlatch the display unit 5, the operator presses one or both of the latch hooks 39 in the direction of arrow D of FIG. 13.

Figure 14:
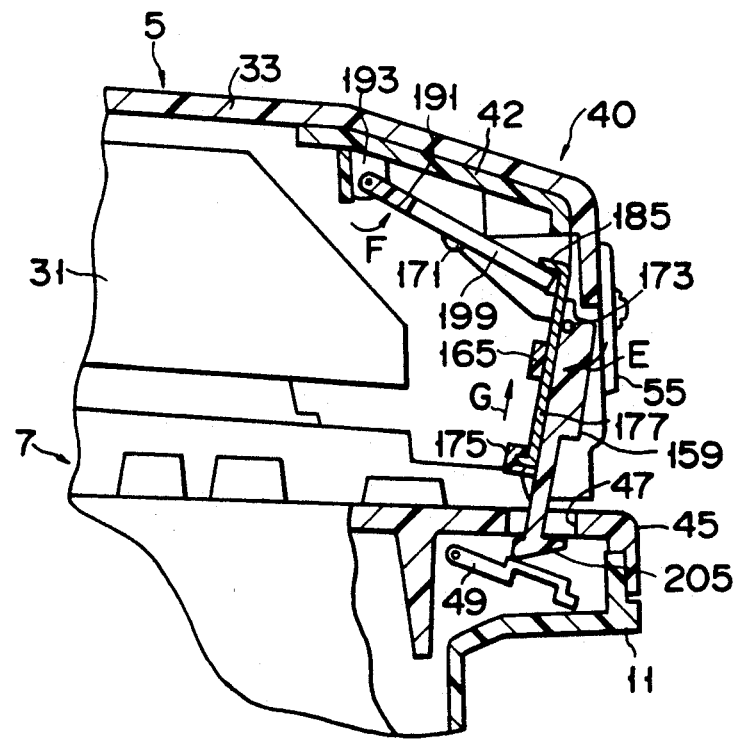

Thereupon, each latch hook 39 is rocked in the direction of arrow E around its corresponding boss 173, as shown in FIG. 13. Then, the control plate 191 is pressed by the legs 171 of the hook 39 in its arcuate grooves 197 and rocked in the direction of arrow F of FIG. 14, resisting the urging force of the spring 195. As the plate 191 rocks in this manner, the tongue 185 of the sliding projection 163 is pressed by the arm 199 of the plate 191, so that the projection 163 is moved in the direction of arrow G of FIG. 14. As a result, the projection body 175 recedes from the latch hole 47, and the sliding projection 163 is moved to its retracted position shown in FIG. 14. Thus, the hook body 159 can be rocked to its release position without any restrictions, and the control plate 191 is rocked in interlock therewith to its second position, as shown in FIG. 14.

Even when only one of the latch hooks 39 is pressed in the direction of arrow C, the resulting force of pressure is transmitted to the other latch hook through the control plate 191, so that the other hook also acts in the aforesaid manner.

By the operation described above, the latch hooks 39 are disengaged from their corresponding latch holes 47, so that the display unit 5 is allowed to be swung open. If the press on the latch hook or hooks 39 is removed after the unit 5 is opened, the hook bodies 159, the sliding projections 163, and the control plate 191 are returned to the latch position, the restricted position, and the first position, respectively, by the respective urging forces of the springs 161 and 195.

When the display unit 5 is rocked from the opened position to the closed position, each latch hook 39 is automatically rocked in a manner such that the slope of its hook portion 205 is in contact with the edge of the latch hole 47, and is thus caused to engage the hole 47.

Figure 15:
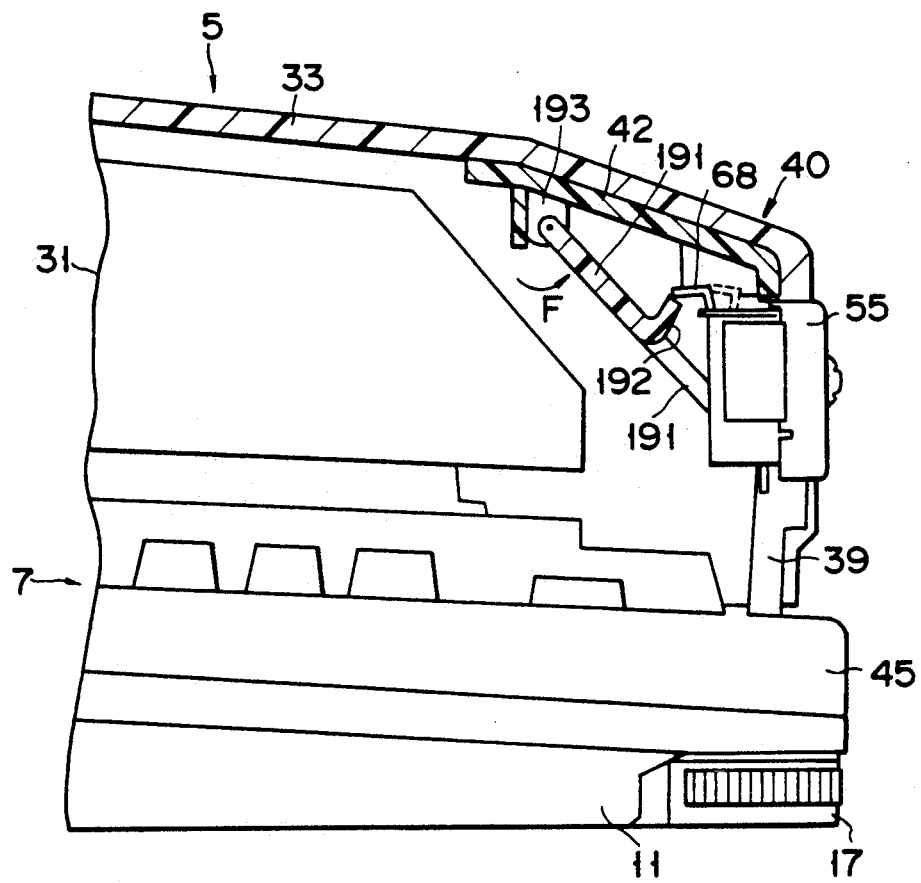

As shown in FIGS. 2 and 10, a combination lock serving as restraining means 55 is attached to the front end portion of the display unit 5. The key 55 is fixed to the latch holder 42 and situated between the two latch hooks 39. As seen from FIG. 15, the key 55 has a lock arm 68, which is movable between a locking position and an unlocking position. In the locking position, as indicated by full line in FIG. 15, the arm 68 is in the path of transfer of the control plate 191. In the unlocking position, as indicated by broken line, the arm 68 is off the transfer path. When the key 55 is on, the lock arm 68 is held in the locking position. When the key 55 is turned off, the arm 68 is moved to the unlocking position.

The control plate 191 has a projection 192 which protrudes toward the latch holder 42 from that region which faces the key 55. If the combination lock serving as restraining means 55 is locked in a state such that each latch hook 39 is in engagement with its corresponding latch hole 47, that is, each hook body 159 and the control plate 191 are situated in the latch position and the first position, respectively, the lock arm 68 projects into the locking position, and engages the projection 192 of the plate 191. As a result, the control plate 191 is restrained from rocking in the direction of arrow F of FIG. 14, and is locked to the first position as illustrated. As the rocking motion of the plate 191 is restrained in this manner, the rocking of the hook body 159 is also restrained. Thus, the hook body 159 is locked to the latch position in which it is in engagement with its corresponding latch hole 47.

As the latch mechanism 40 is locked in this manner, the display unit 5 is locked to the closed position. Even if each latch body 159 is bent to unlock the mechanism 40 by force, in this state, the projection body 175 engages the rear end edge of its corresponding latch hole 47. Thus, the latch mechanism 40 cannot be forcibly unlocked.

Since the computer itself can be disabled from operating when the display unit 5 is prevented from being lifted from the base unit 3 by turning the key 55 on, wrong use of the apparatus can be securely prevented.

It is to be understood that the present invention is not limited to the embodiment described above, and that various changes and modifications may be effected therein by one skilled in the art without departing from the scope or spirit of the invention.

For example, the restraining means is not limited to the aforementioned combination lock, and may be of any type which is provided with a lock member capable of projecting into the path of transfer of the control plate.

What is claimed is:

1. A portable electronic apparatus comprising:
   a housing;
   input means mounted on the housing for inputting information;
   a display unit mounted on the housing for movement between a closed position in which the input means is covered by the display unit and an open operative position in which the input means is accessible;
   a pair of latch means, each being movable between (1) a latch position in which the latch means engages the housing so as to enable the display unit to be secured in the closed position and (2) a release position in which the latch means is disengaged from the housing so as to enable the display unit to be moved into the open position;
   interlocking means, movable with the latch means between a first position in which the interlock means holds the latch means in engagement with the housing to a second position in which the interlocking means allows the latch means to take the release position, the interlocking means moving between the first position and the second position as the latch means begins to move from the latch position toward the release position; and
   lock means for restraining the movement of the interlocking means, the lock means having an unlocked position in which the interlocking means can move with the latch means between the first position and the second position to allow the latch means to move from the latch position to the release position and a locked position in which the lock means holds the interlocking means in the first position which prevents the latch means from leaving the latch position.

2. An apparatus according to claim 1, wherein each of the latch means includes a latch hook attached to the display unit and rockable between the latch position and the release position.

3. An apparatus according to claim 2, wherein the interlocking means includes a pair of engaging portions, one engaged with each of the latch hooks and mounted on the display unit so as to be rockable between the first position and the second position in motion transmitting relationship with the latch hooks.

4. An apparatus according to claim 3, wherein the lock means includes a lock member movable between a locked position in which the lock member engages the interlocking means to restrain the interlocking means from rocking from the first position to the second position and an unlocked position in which the lock member is disengaged from the interlocking means and allows the interlocking means to rock, the lock member being adapted to be kept in the locked position when the lock means is moved into the locked position.

5. An apparatus according to claim 4, wherein the lock means includes a combination lock.

6. A portable electronic apparatus comprising:
   a housing having a latch hole of a predetermined width;
   input means mounted on the housing for inputting information;
   a display unit mounted on the housing for movement between a closed position in which the input means is covered by the display unit and an open operative position in which the input means is accessible;
   lock means provided at the display unit for locking the display unit in the closed position when the display unit is moved to the closed position, the lock means including latch means movable between a latch position in which the latch means engages the latch hole of the housing and a release position in which the latch means is disengaged form the housing, and an interlocking member biased for movement with movement of the latch means, the latch means including (1) a hook portion adapted to penetrate the latch hole to engage the housing when the display unit is moved to the closed position, and (2) a sliding member slidably attached to the hook body so as to be movable between a restricted position in which the sliding member is situated in the latch hole to restrict disengagement of the hook portion from the housing, and a retracted position in which the sliding member is retracted from the latch hole, the interlocking member including a pressing portion for moving each of the sliding members from the restricted position to the retracted position in accordance with the movement of the hook bodies from the latch position to the release position; and
   means attached to the display unit for restraining the movement of the interlocking member so that the interlocking member does not move the sliding members from the restricted position so as to lock the latch means in the latch position.

7. A portable electronic apparatus comprising:
   a housing having a pair of latch holes;
   input means mounted on the housing, for inputting information;
   a display unit mounted on the housing for movement between a closed position in which the input means is covered by the display unit and an open operative position in which the input means is accessible;
   a pair of latch means provided at the display unit for holding the display unit in the closed position when the display unit is moved to the closed position, each of said latch means including (1) a latch body having a hook portion and movable between a latch position in which the hook portion penetrates the latch hole and engages the housing and a release position in which the hook portion is disengaged from the housing, and (2) a sliding member slidably engaged with the hook body and movable between a restricted position in which the sliding member is situated in the latch hole to restrict disengagement of the hook portion from the housing and a retracted position in which the sliding member is retracted from the latch hole; and an interlocking member provided at the display unit and movable in accordance with the movement of the latch body, the interlocking member having pressing portions for moving the sliding members from the restricted position to the retracted position in accordance with the movement of the latch bodies form the latch position to the release position.

8. A portable electronic apparatus comprising:

a housing having a latch hole having a predetermined width;

input means mounted on the housing for inputting information;

a display unit mounted on the housing and movable between a closed position in which the input means is covered by the display unit and a desired opened position in which the input means is exposed;

lock means provided at the display unit for locking the display unit in the closed position when the display unit is moved to the closed position, the lock means including (1) latch means movable between a latch position in which the latch means engages the housing and a release position in which the latch means is disengaged from the housing, the latch means including a latch hook attached to the display unit to be rockable between the latch position in which the latch hook engages the latch hole and the release position in which the latch hook does not engage the latch hole, and (2) an interlocking member movable from a first position corresponding to the latch position to a second position corresponding to the release position, the interlocking member having engaging portions engaged with the latch hooks and mounted on the display unit so as to be rockable between the first position and the second position with movement of the latch means from the latch position toward the release position; and means attached to the display unit for restraining the movement of the interlocking member from the first position, the restraining means including a lock member movable between a locked position in which the lock member engages the interlocking member to restrain the interlocking member from moving from the first position to the second position and an unlocked position in which the lock member is disengaged from the interlocking member and allows the interlocking member to move from the first position to the second position upon movement of the latch means from the latch position to the release position.

* * * * *